United States Patent
Fujiwara et al.

(10) Patent No.: US 7,651,816 B2
(45) Date of Patent: Jan. 26, 2010

(54) POSITIVE ELECTRODE ACTIVE MATERIAL, NON-AQUEOUS ELECTROLYTE SECONDARY BATTERY CONTAINING THE SAME AND METHOD FOR EVALUATING POSITIVE ELECTRODE ACTIVE MATERIAL

(75) Inventors: Shozo Fujiwara, Neyagawa (JP); Hideya Asano, Hirakata (JP); Hajime Konishi, Ikoma (JP)

(73) Assignee: Panasonic Corporation, Osaka (JP)

( * ) Notice: Subject to any disclaimer, the term of this patent is extended or adjusted under 35 U.S.C. 154(b) by 982 days.

(21) Appl. No.: 11/085,040

(22) Filed: Mar. 22, 2005

(65) Prior Publication Data

US 2005/0221182 A1    Oct. 6, 2005

(30) Foreign Application Priority Data

Mar. 30, 2004    (JP)    .............................. 2004-098987

(51) Int. Cl.
   *H01M 4/48*   (2006.01)
   *C01G 57/00*   (2006.01)
(52) U.S. Cl. ............... 429/231.3; 429/231.1; 423/593.1
(58) Field of Classification Search .................. None
   See application file for complete search history.

(56) References Cited

U.S. PATENT DOCUMENTS 6,248,477 B1 * 6/2001 Howard et al. ............... 429/224
6,416,902 B1 * 7/2002 Miyasaka .................... 429/223

FOREIGN PATENT DOCUMENTS

JP    10-125325    5/1998
JP    10-312792    11/1998

* cited by examiner

*Primary Examiner*—John S Maples
(74) *Attorney, Agent, or Firm*—McDermott Will & Emery LLP

(57) ABSTRACT

A positive electrode active material powder for a non-aqueous electrolyte secondary battery, wherein an amount of a liquid reagent absorbed by the powder is 20 to 40 ml per 100 g of the powder when the liquid reagent is dibutyl phthalate, and the amount is 20 to 50 ml per 100 g of the powder when the liquid reagent is N-methyl-2-pyrrolidone or water, the absorption amount is a value measured using a device according to test method A or B regarding DBP absorption based on JIS K6217 (1997), and the measured value is an amount of the liquid reagent added until the viscosity of a mixture of the powder and the liquid reagent reaches a level corresponding to 70% of a maximum torque which is recorded when a change in the viscosity of a mixture of the powder and the liquid reagent is measured by a torque detecting device.

2 Claims, 2 Drawing Sheets

POSITIVE ELECTRODE ACTIVE MATERIAL, NON-AQUEOUS ELECTROLYTE SECONDARY BATTERY CONTAINING THE SAME AND METHOD FOR EVALUATING POSITIVE ELECTRODE ACTIVE MATERIAL

BACKGROUND OF THE INVENTION

The present invention relates to a non-aqueous electrolyte secondary battery, and more particularly to a lithium-containing composite oxide used as a positive electrode active material for a non-aqueous electrolyte secondary battery.

Since lithium-containing composite oxides can intercalate and deintercalate lithium ions reversibly and repeatedly, attempts have been made to use them as a positive electrode material for so-called lithium ion secondary batteries. Among lithium-containing composite oxides, particularly promising are Li—Mn composite oxide, Li—Co composite oxide and Li—Ni composite oxide, some of which have already been commercialized. In order to improve the characteristics as the positive electrode material, attempts have also been made to partially replace a transition metal element of a conventional lithium-containing composite oxide with other metal element. Those currently proposed are Li—Mn—Ni composite oxide, Li—Co—Al composite oxide and Li—Mg—Co composite oxide.

In the development and improvement process of electrode materials for obtaining excellent battery characteristics, the elements for constituting the electrode material and the composition thereof are first selected. Secondly, the optimal baking conditions for raw materials for obtaining the electrode material are determined. Under this process, because crystallographic or electrochemical basic data are examined, an evaluation and analysis using a small amount of sample often provides sufficient results.

Subsequently, an examination is made to check if the improved electrode material is applicable to the actual production of electrode plates. Under this process, firstly, the electrode material is dispersed in a liquid component to give a paste, and the quality of the paste is checked. Secondly, the paste is applied onto a current collector, followed by drying to give an electrode plate, and the electrode plate is tested for flexibility, mechanical strength, etc.

The quality of the paste is determined from an industrial point of view. More specifically, because the paste is sometimes sit for a while before it is applied onto a current collector, the stability against change with time is examined. Industrially speaking, for example, a paste as a non-Newtonian fluid is desired because the amount of the electrode material that settles out within the paste with time is small, and it is easy to apply. Desirably, the viscosity of the paste does not vary greatly with time.

Conventionally, the improvement of lithium-containing composite oxides has been done focusing on the powder properties thereof. For example, Japanese Laid-Open Patent Publications Nos. Hei 10-125325 and Hei 10-312792 focus on typical powder properties such as average particle size and specific surface area.

Even a lithium-containing composite oxide expected to be suitable for the production of electrode plates based on the findings of the past and the known powder properties can cause a problem when it is practically used in the production of electrode plates. That is, when an electrode material mixture paste prepared by mixing a lithium-containing composite oxide with a conductive material, a binder and a liquid component is applied onto a current collector, followed by drying to give an electrode plate, the material mixture might be separated and detached from the current collector.

BRIEF SUMMARY OF THE INVENTION

The present invention focuses on the physical properties of a lithium-containing composite oxide that have not conventionally been examined. The invention is intended to overcome the problem that occurs during the actual production of electrode plates by controlling the physical properties. Moreover, the present invention can determine whether a lithium-containing composite oxide is truly suitable for the production of electrode plates or not by evaluating the physical properties.

The present invention relates to a positive electrode active material for a non-aqueous electrolyte secondary battery comprising a lithium-containing composite oxide powder, wherein an absorption amount of a liquid reagent absorbed by the powder is 20 to 40 ml per 100 g of the powder when the liquid reagent is dibutyl phthalate (DBP), and the amount is 20 to 50 ml per 100 g of the powder when the liquid reagent is N-methyl-2-pyrrolidone (NMP) or water. The absorption amount is a value measured using a device according to DBP absorption test method A or B based on JIS K6217 (1997). The measured value is an amount of the liquid reagent per 100 g of the powder added until the viscosity of a mixture of the powder and the liquid reagent reaches a level corresponding to 70% of a maximum torque which is recorded when the powder is introduced into the device, and the liquid reagent is added dropwise thereto, during which a change in the viscosity of the mixture is measured by a torque detecting device.

The present invention further relates to a non-aqueous electrolyte battery comprising: an electrode group comprising a negative electrode plate, a positive electrode plate containing the positive electrode active material described above, and a separator interposed between the negative electrode plate and the positive electrode plate; a battery case for housing the electrode group; and a non-aqueous electrolyte to be injected into the battery case.

The present invention still further relates to a method for evaluating a lithium-containing composite oxide powder used for a non-aqueous electrolyte secondary battery. The method comprises a step of measuring an amount of a liquid reagent absorbed by the powder using a device according to DBP absorption test method A or B based on JIS K6217 (1997).

In the evaluation method, the liquid reagent can be dibutyl phthalate, N-methyl-2-pyrrolidone or water.

An object of the present invention is to control the physical properties of a positive electrode active material so as to obtain a positive electrode material mixture paste having excellent properties or a positive electrode plate having excellent properties. Accordingly, as long as the active material has controlled physical properties, the effects of the present invention do not depend on the type of lithium-containing composite oxide, namely, the type of metal element, the combination of metal elements or the composition thereof, and the production process of lithium-containing composite oxide or the production conditions thereof.

The present invention is applicable to, for example, Li—Mn composite oxide, Li—Co composite oxide, Li—Ni composite oxide, Li—Mn—Ni composite oxide, Li—Co—Al composite oxide and Li—Mg—Co composite oxide.

According to the present invention, it is possible to provide a highly practical positive electrode for a non-aqueous electrolyte secondary battery or non-aqueous electrolyte secondary battery having excellent properties and excellent in productivity.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
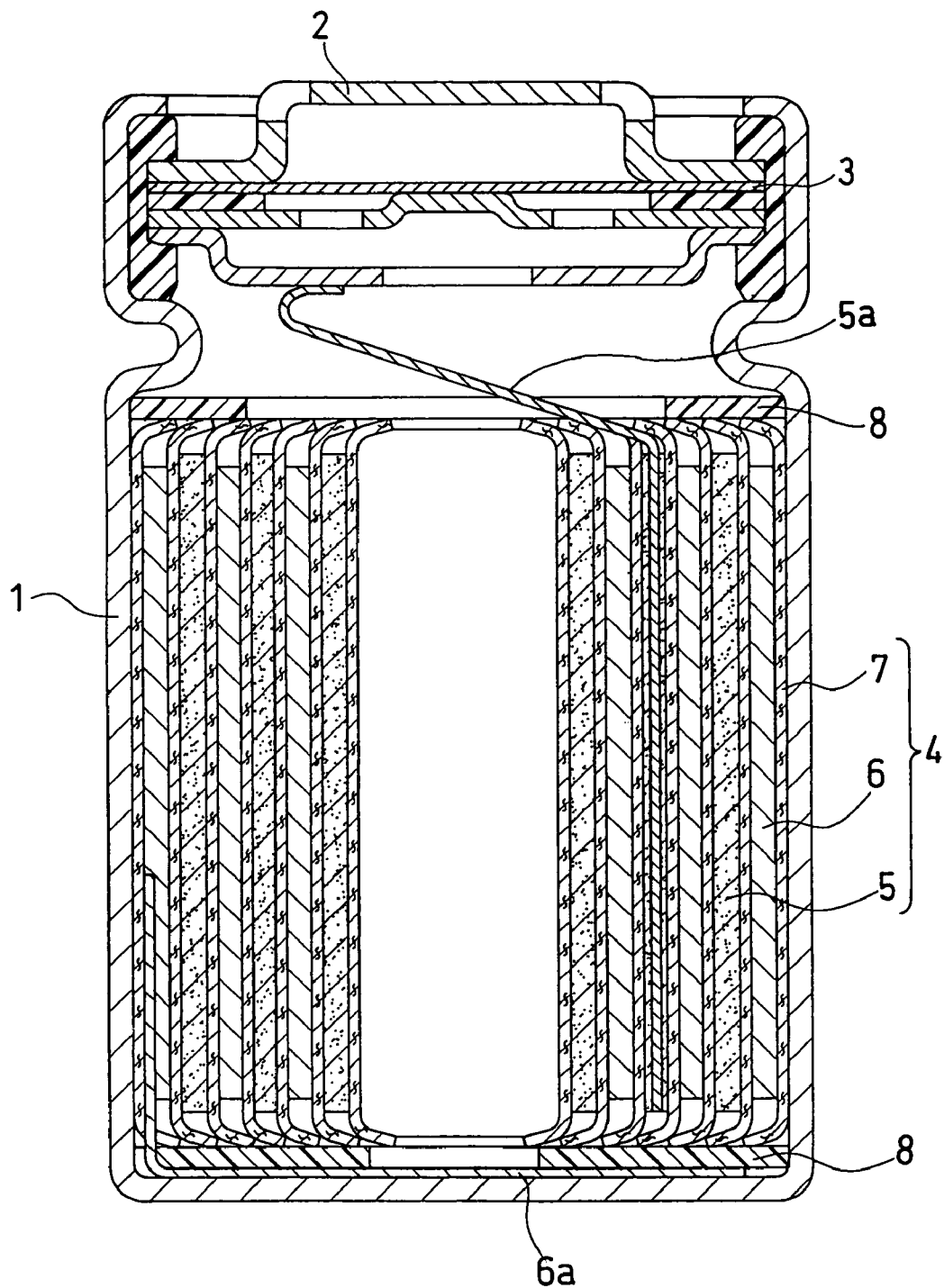
FIG. 1 is a vertical cross sectional view of a cylindrical lithium ion secondary battery.

The present invention focuses on the powder property not having been examined, namely, an absorption amount of a liquid reagent absorbed by a lithium-containing composite oxide used as a positive electrode active material for a non-aqueous electrolyte secondary battery. According to the present invention, by controlling the amount of a liquid reagent absorbed by a lithium-containing composite oxide powder, the problem that occurs during the actual production of electrode plates can be prevented. The present invention also encompasses a method for determining whether the lithium-containing composite oxide is truly suitable for the production of positive electrode plates by evaluating the amount of a liquid reagent absorbed by the lithium-containing composite oxide obtained by a synthesis or the like.

The present invention is to control the physical properties of a lithium-containing composite oxide so as to obtain a material mixture paste having excellent properties or an electrode plate having excellent properties. The effects of the present invention are obtained principally as long as the powder has a certain absorption amount. The effects of the present invention are not affected by the type of lithium-containing composite oxide, namely, the type of elements constituting the lithium-containing composite oxide, the combination of the elements, or the content of the elements. Also, they do not depend on the production process of the lithium-containing composite oxide. Accordingly, the present invention is applicable to various active materials.

The positive electrode active material for a non-aqueous electrolyte secondary battery of the present invention comprises a lithium-containing composite oxide powder having a certain absorption amount.

The positive electrode active material of the present invention is obtained by synthesizing a powder having a certain absorption amount. In the synthesis of the powder, for example, the intended absorption amount of a liquid reagent is first determined. Then, the raw materials are selected and the synthesis conditions are set so as to achieve the intended absorption amount. The conditions for the synthesis cannot be specified because they vary depending on the raw materials used, and various factors can affect the synthesis such as temperature and baking atmosphere. However, a person skilled in the art can select the raw materials and find the synthesis conditions for preparing the powder having the intended absorption amount, once the intended absorption amount of a liquid reagent is determined.

The lithium-containing composite oxide contains lithium as a first metal element and a metal element other than lithium as a second metal element. The second metal element preferably contains at least a transition metal element. The second metal element may be a single element or a combination of a plurality of elements. Examples of the transition metal element suitable as the second metal element include Co, Ni and Mn. Examples of the metal element suitable as the second metal element other than transition metal elements include Al and Mg. The lithium-containing composite oxide may further contain a typical element in addition to lithium (i.e. the first metal) and the second metal element.

The lithium-containing composite oxide that can provide remarkable effects of the present invention is represented by the general formula: $Li_aMO_b$, where M is a metal element other than Li.

The lithium-containing composite oxide is in the form of a powder. The average particle size of the powder, the particle distribution thereof and the shape thereof are not specifically limited. However, in order to achieve an intended absorption amount, the lithium-containing composite oxide preferably has an average particle size of 5 to 15 μm, a specific surface area of 0.3 to 1.2 $m^2$/g, and a tap density of 1.5 to 2.5 g/$cm^3$. The shape of the particle constituting the powder may be spherical, nearly spherical, oval, indefinite, flake, or any shape other than the above.

In the case where the liquid reagent is dibutyl phthalate (DBP), the lithium-containing composite oxide powder of the present invention has a DBP absorption amount of 20 to 40 ml per 100 g of the powder. When the DBP absorption amount is less than 20 ml per 100 g of the powder, an electrode plate having desired performance cannot be produced. Conversely, when the DBP absorption amount exceeds 40 ml, a material mixture paste having stable properties cannot be produced.

In the case where the liquid agent is N-methyl-2-pyrrolidone (NMP), the lithium-containing composite oxide powder of the present invention has a NMP absorption amount of 20 to 50 ml per 100 g of the powder. When the NMP absorption amount is less than 20 ml per 100 g of the powder, an electrode plate having desired performance cannot be produced. Conversely, when the NMP absorption amount exceeds 50 ml, a material mixture paste having stable properties cannot be produced.

In the case where the liquid agent is water, the lithium-containing composite oxide powder of the present invention has a water absorption amount of 20 to 50 ml per 100 g of the powder. When the water absorption amount is less than 20 ml per 100 g of the powder, an electrode plate having desired performance cannot be produced. Conversely, when the water absorption amount exceeds 50 ml, a material mixture paste having stable properties cannot be produced.

The liquid reagent may be any liquid used as a dispersion medium for a positive electrode material mixture paste.

In the present invention, the amount of the liquid reagent absorbed by the lithium-containing composite oxide powder is a value measured by a device according to DBP absorption amount test method A or B based on JIS K6217 (1997).

Examples of the device according to DBP absorption test method A or B based on JIS K6217 (1997) include absorptometer, plastograph and plasticorder.

The absorption amount is measured in the manner described below.

The liquid reagent is added dropwise to the powder contained in the device using a buret such as constant rate buret or quantitative buret, during which the change of the viscosity of the mixture of the powder and the liquid reagent is measured.

As the number of the droplets is increased, the viscosity of the mixture changes. The change of the viscosity is measured by, for example, a torquemeter. The data of the change of the viscosity measured is stored in a storage medium such as paper, magnetic disk, hard disk drive or memory device.

Subsequently, the amount of the liquid reagent per 100 g of the powder added until the viscosity reaches a level corresponding to 70% of the recorded maximum torque is referred to as "absorption amount".

The "JIS K6217 (1997)" used herein means Japanese Industrial Standard K6217 established in 1997.

Specific examples of the device according to DBP absorption amount test method A or B based on JIS K6217 (1997) include Absorptometer manufactured by Brabender, Plastograph manufactured by Brabender, PlastiCorder PL2000 manufactured by Brabender and the absorption amount-measuring device S-36A manufactured by Asahi Soken Co., Ltd.

The powder is introduced in the kneading chamber (mixing chamber) of the device. The amount of the powder introduced therein is preferably 10 to 300 g, which can be changed depending on the bulk density of the powder.

The rate of the liquid reagent added from the buret is preferably 4 ml/min per 100 g. Any rate around this value can give excellent reproducibility of measurement.

During the addition of the liquid reagent, the powder should be constantly stirred by a stirring means of the device and mixed with the liquid reagent. The atmosphere in which the powder is stirred can be air. The temperature of the liquid regent is preferably 20 to 30° C. The temperature within the buret is preferably maintained at a constant temperature.

During the measurement of the viscosity change, the temperature of the stirred mixture is maintained at 20 to 30° C. Preferably, the temperature is controlled to be constant at any temperature within the above temperature range.

The present invention encompasses a non-aqueous electrolyte secondary battery comprising a positive electrode containing the lithium-containing composite oxide powder described above as a positive electrode active material. The positive electrode may contain other positive electrode active materials in addition to the above-described lithium-containing composite oxide. In order to obtain the effects of the present invention, the amount of other positive electrode active materials is preferably less than 40 wt % of the total amount of the positive electrode active material.

The positive electrode active material is usually, but not limited to, mixed with at least a resin binder and a conductive material to prepare a positive electrode material mixture. The positive electrode material mixture is mixed with a liquid component to prepare a positive electrode material mixture paste. The positive electrode material mixture paste is applied onto a current collector, which is then dried to remove the liquid component, followed by rolling. As a result, an electrode plate comprising a current collector and positive electrode material mixture layers formed on the current collector is produced. The electrode plate is cut into a predetermined shape to produce a positive electrode plate for a non-aqueous electrolyte secondary battery.

The non-aqueous electrolyte secondary battery comprises an electrode group, a battery case for housing the electrode group and a non-aqueous electrolyte to be injected into the battery case. The electrode group is produced by stacking a negative electrode plate and the positive electrode plate with a separator interposed therebetween. The obtained stack is usually spirally-wound.

The components that constitute the non-aqueous electrolyte secondary battery of the present invention such as negative electrode plate, separator, non-aqueous electrolyte and battery case are not specifically limited. Accordingly, the components can be appropriately selected from those conventionally used.

The present invention is described in further detail below with reference to the accompanying drawings. It should be understood that the examples given below are merely illustrative and the scope of the present invention is not limited thereto.

[Evaluation 1]

The physical properties of the lithium-containing composite oxide were measured in the procedure described below in EXAMPLEs and COMPARATIVE EXAMPLEs.

(1) DBP Absorption Amount

The DBP absorption amount was measured according to the A test method based on JIS K6217 (1997). The absorption amount-measuring device S-36A, manufactured by Asahi Soken Co., Ltd., was used for measurement.

A sample powder in an amount of 50 g was introduced into the kneading chamber (mixing chamber) of the measuring device having a capacity of 100 $cm^3$, which was then stirred by rotor blade comprising two blades. DBP at 25° C. was then added dropwise using a buret to the stirred powder at a constant rate, during which the change in the viscosity of the mixture consisting of the powder and DBP was measured. The rate at which DBP was added was set at 4 ml/min.

The powder flowed freely at first. As the number of droplets was increased, the mixture consisting of the powder and DBP turned into a semiplastic mass. The viscosity change was measured by a torquemeter, and the data was stored in a recorder.

Then, the amount of DBP per 100 g of the powder added until the viscosity reached a level corresponding to 70% of the recorded maximum torque was referred to as "DBP absorption amount".

During the measurement of the viscosity change, the temperature of the stirred mixture was maintained at about 25° C.

(2) NMP Absorption Amount

The NMP absorption amount was measured in the same manner as above (1) except that N-methyl-2-pyrrolidone (NMP) was used instead of DBP.

(3) Water Absorption Amount

The water absorption amount was measured in the same manner as above (1) except that water was used instead of DBP.

(4) Average Particle Size (Volume-Based Average Particle Size ($D_{50}$))

A sample powder in an amount of 10 g was mixed with about 1 ml of an aqueous solution containing 2 vol % polyoxyethylene sorbitan monolaurate. The resulting powder was dispersed in an appropriate amount of ion exchange water. With the use of the laser scattering particle size distribution analyzer LA-910, manufactured by Horiba, Ltd., volume-based average particle size $D_{50}$ (median size) was obtained.

(5) BET Specific Surface Area

With the use of AMS-8000 manufactured by Ohkura Riken Co., Ltd., the BET specific surface area of the powder was measured by single-point method using nitrogen gas absorption at a relative pressure of 0.3. In this measurement, pre-drying was performed by heating the powder at 350° C., after which nitrogen gas was circulated for 15 minutes to allow nitrogen to be adsorbed on the powder.

[Evaluation 2]

The physical properties of the positive electrode plate were measured in the procedure described below in EXAMPLEs and COMPARATIVE EXAMPLEs.

(6) Peel Strength Between Material Mixture and Current Collector

A positive electrode plate was cut into a size of 80 mm×10 mm by a cutter. One surface of the obtained sample electrode plate having the material mixture thereon was attached to a pedestal using double-sided adhesive tape. An edge of the current collector was separated from the material mixture of the sample electrode plate attached to the pedestal using a utility knife having a sharp tip. The separated edge of the current collector was pulled in a direction vertical to the pedestal surface using a pull tester equipped with a load cell to completely separate the current collector from the material mixture, during which the force required for the separation was measured. The measured value was referred to as "peel strength between the material mixture and the current collector".

EXAMPLE 1

(i) Preparation of Lithium-Containing Composite Oxide

As a lithium-containing composite oxide, $LiCoO_2$ was prepared in the procedure below.

An aqueous solution containing 1.0 mol/L cobalt sulfate dissolved therein was continuously fed into a reaction vessel, during which sodium hydroxide was added dropwise to the reaction vessel with the pH of the aqueous solution in the vessel maintained at 10 to 13, to yield $Co(OH)_2$, i.e. the hydroxide precursor for $LiCoO_2$. In order to make the reaction uniform, the aqueous solution in the reaction vessel was constantly stirred by a motor at a constant rate of 500 rpm.

The hydroxide precursor was mixed with lithium carbonate such that the molar ratio of cobalt and lithium was 1:1. The resulting mixture was then prebaked (first baking) in an atmosphere of air at 600° C. for 10 hours, which was then pulverized.

The pulverized mixture was baked again (second baking) in an atmosphere of air at 900° C. for 10 hours, which was then further pulverized and sieved to give $LiCoO_2$ (hereinafter referred to as "positive electrode active material 1").

(ii) Production of Positive Electrode

A positive electrode material mixture paste was prepared by mixing 100 parts by weight of the positive electrode active material $LiCoO_2$, 2 parts by weight of acetylene black as a conductive material, 2 parts by weight of polyvinylidene fluoride (PVDF) as a binder and an appropriate amount of N-methyl-2-pyrrolidone (NMP) as a dispersion medium. The prepared positive electrode material mixture paste was applied onto both surfaces of a 20 μm thick current collector made of aluminum foil, followed by drying. The current collector having the positive electrode material mixture applied thereon was rolled using a roller. The resultant was cut into a strip having a given size to give a positive electrode plate (herein after referred to as "positive electrode plate 1").

(iii) Production of Negative Electrode Plate

A negative electrode material mixture paste was prepared by mixing 100 parts by weight of pulverized graphite having an average particle size of about 20 μm, 2 parts by weight of styrene butadiene rubber as a binder and 100 parts by weight of an aqueous solution containing carboxymethyl cellulose at a concentration of 1 wt %. The prepared negative electrode material mixture paste was applied onto both surfaces of a 15 μm thick current collector made of copper foil, followed by drying. The current collector having the negative electrode material mixture paste applied thereon was rolled using a roller. The resultant was cut into a strip having a given size to give a negative electrode plate.

(iv) Production of Non-aqueous Electrolyte Secondary Battery

As the non-aqueous electrolyte secondary battery, a cylindrical lithium ion secondary battery as shown in FIG. 1 was produced.

An end of a positive electrode lead 5a made of aluminum was connected to the current collector of the above produced strip-shaped positive electrode plate 5. An end of a negative electrode lead 6a made of nickel was connected to the current collector of the strip-shaped negative electrode plate 6. The positive electrode plate 5 and the negative electrode plate 6 were spirally wound with a 25 μm thick separator 7 having a width wider than that of the positive and negative electrode plates interposed therebetween to give an electrode group. The separator 7 was a microporous membrane made of polyethylene resin. The outer surface of the electrode group was wrapped by the separator 7. On the top and the bottom of the electrode group were placed an upper insulating ring 8a and a lower insulating ring 8b, respectively. The obtained electrode group was then housed in a cylindrical battery case 1. Subsequently, a non-aqueous electrolyte was injected into the battery case 1 to impregnate the electrode group with the non-aqueous electrolyte. The other end of the positive electrode lead 5a was then welded to the underside of a sealing plate 2 having an insulating packing 3 arranged on the periphery thereof. The other end of the negative electrode lead 6a was welded to the inner bottom face of the battery case 1. The opening of the battery case 1 was sealed with the sealing plate 2. Thereby, a cylindrical lithium ion secondary battery (hereinafter referred to as "battery 1") was produced.

The non-aqueous electrolyte used here was prepared by dissolving $LiPF_6$ in a solvent mixture of ethylene carbonate (EC), ethyl methyl carbonate (EMC) and dimethyl carbonate (DMC) at a volume ratio of 1:2.5:0.5 at a $LiPF_6$ concentration of 1 mol/L.

EXAMPLE 2

As a lithium-containing composite oxide, $LiCo_{0.995}Mg_{0.005}O_2$ was prepared in the procedure below.

A mixed aqueous solution containing 0.995 mol/L cobalt sulfate and 0.005 mol/L magnesium sulfate dissolved therein was continuously fed into a reaction vessel, during which sodium hydroxide was added dropwise to the reaction vessel with the pH of the aqueous solution in the vessel maintained at 10 to 13, to yield $Co_{0.995}Mg_{0.005}(OH)_2$, i.e. the hydroxide precursor for $LiCo_{0.995}Mg_{0.005}O_2$. In order to make the reaction uniform, the aqueous solution in the reaction vessel was constantly stirred by a motor at a constant rate of 500 rpm.

The hydroxide precursor was mixed with lithium carbonate such that the molar ratio of cobalt, magnesium and lithium was 0.995:0.005:1. The resulting mixture was then prebaked (first baking) in an atmosphere of air at 600° C. for 10 hours, which was then pulverized.

The pulverized mixture was baked again (second baking) in an atmosphere of air at 900° C. for 10 hours, which was then further pulverized and sieved to give $LiCo_{0.995}Mg_{0.005}O_2$ (hereinafter referred to as "positive electrode active material 2").

A positive electrode plate and a lithium ion secondary battery were produced in the same manner as EXAMPLE 1 except that the positive electrode active material 2 was used instead of the positive electrode active material 1. The thus-obtained positive electrode plate and lithium ion secondary battery are referred to as "positive electrode plate 2" and "battery 2", respectively.

EXAMPLE 3

As a positive electrode active material, $LiCo_{0.995}Mg_{0.005}O_2$ was prepared in the same manner as EXAMPLE 2 (hereinafter referred to as "positive electrode active material 3") except that the temperature of the second baking after the prebaking (first baking) was changed from 900° C. to 950° C.

A positive electrode plate and a lithium ion secondary battery were produced in the same manner as EXAMPLE 1 except that the positive electrode active material 3 was used instead of the positive electrode active material 1. The thus-obtained positive electrode plate and lithium ion secondary battery are referred to as "positive electrode plate 3" and "battery 3", respectively.

EXAMPLE 4

As a positive electrode active material, $LiCo_{0.995}Mg_{0.005}O_2$ was prepared in the same manner as EXAMPLE 2 (hereinafter referred to as "positive electrode active material 4") except that the temperature of the second baking after the prebaking (first baking) was changed from 900° C. to 1000° C.

A positive electrode plate and a lithium ion secondary battery were produced in the same manner as EXAMPLE 1 except that the positive electrode active material 4 was used instead of the positive electrode active material 1. The thus-obtained positive electrode plate and lithium ion secondary battery are referred to as "positive electrode plate 4" and "battery 4", respectively.

EXAMPLE 5

As a positive electrode active material, $LiCo_{0.995}Mg_{0.005}O_2$ was prepared in the same manner as EXAMPLE 2 (hereinafter referred to as "positive electrode active material 5") except that the temperature of the second baking after the prebaking (first baking) was changed from 900° C. to 1050° C.

A positive electrode plate and a lithium ion secondary battery were produced in the same manner as EXAMPLE 1 except that the positive electrode active material 5 was used instead of the positive electrode active material 1. The thus-obtained positive electrode plate and lithium ion secondary battery are referred to as "positive electrode plate 5" and "battery 5", respectively.

EXAMPLE 6

As a lithium-containing composite oxide, $LiCo_{0.995}Al_{0.005}O_2$ was prepared in the procedure below.

A mixed aqueous solution containing 0.995 mol/L cobalt sulfate and 0.0025 mol/L $Al_2(SO_4)_3$ dissolved therein was continuously fed into a reaction vessel, during which sodium hydroxide was added dropwise to the reaction vessel with the pH of the aqueous solution in the vessel maintained at 10 to 13, to yield $Co_{0.995}Al_{0.005}(OH)_2$, i.e. the hydroxide precursor for $LiCo_{0.995}Al_{0.005}O_2$. In order to make the reaction uniform, the aqueous solution in the reaction vessel was constantly stirred by a motor at a constant rate of 500 rpm.

The hydroxide precursor was mixed with lithium carbonate such that the molar ratio of cobalt, aluminum and lithium was 0.995:0.005:1. The resulting mixture was then prebaked (first baking) in an atmosphere of air at 600° C. for 10 hours, which was then pulverized.

The pulverized mixture was baked again (second baking) in an atmosphere of air at 900° C. for 10 hours, which was then further pulverized and sieved to give $LiCo_{0.995}Al_{0.005}O_2$ (hereinafter referred to as "positive electrode active material 6").

A positive electrode plate and a lithium ion secondary battery were produced in the same manner as EXAMPLE 1 except that the positive electrode active material 6 was used instead of the positive electrode active material 1. The thus-obtained positive electrode plate and lithium ion secondary battery are referred to as "positive electrode plate 6" and "battery 6", respectively.

EXAMPLE 7

As a lithium-containing composite oxide, $LiCo_{0.995}Mn_{0.005}O_2$ was prepared in the procedure below.

A mixed aqueous solution containing 0.995 mol/L cobalt sulfate and 0.005 mol/L manganese sulfate dissolved therein was continuously fed into a reaction vessel, during which sodium hydroxide was added dropwise to the reaction vessel with the pH of the aqueous solution in the vessel maintained at 10 to 13, to yield $Co_{0.995}Mn_{0.005}(OH)_2$, i.e. the hydroxide precursor for $LiCo_{0.995}Mn_{0.005}O_2$. In order to make the reaction uniform, the aqueous solution in the reaction vessel was constantly stirred by a motor at a constant rate of 500 rpm.

The hydroxide precursor was mixed with lithium carbonate such that the molar ratio of cobalt, manganese and lithium was 0.995:0.005:1. The resulting mixture was then prebaked (first baking) in an atmosphere of air at 600° C. for 10 hours, which was then pulverized.

The pulverized mixture was baked again (second baking) in an atmosphere of air at 900° C. for 10 hours, which was then further pulverized and sieved to give $LiCo_{0.995}Mn_{0.005}O_2$ (hereinafter referred to as "positive electrode active material 7").

A positive electrode plate and a lithium ion secondary battery were produced in the same manner as EXAMPLE 1 except that the positive electrode active material 7 was used instead of the positive electrode active material 1. The thus-obtained positive electrode plate and lithium ion secondary battery are referred to as "positive electrode plate 7" and "battery 7", respectively.

EXAMPLE 8

As a lithium-containing composite oxide, $LiCo_{0.995}Ni_{0.005}O_2$ was prepared in the procedure below.

A mixed aqueous solution containing 0.995 mol/L cobalt sulfate and 0.005 mol/L nickel sulfate dissolved therein was continuously fed into a reaction vessel, during which sodium hydroxide was added dropwise to the reaction vessel with the pH of the aqueous solution in the vessel maintained at 10 to 13, to yield $Co_{0.995}Ni_{0.005}(OH)_2$, i.e. the hydroxide precursor for $LiCo_{0.995}Ni_{0.005}O_2$. In order to make the reaction uniform, the aqueous solution in the reaction vessel was constantly stirred by a motor at a constant rate of 500 rpm.

The hydroxide precursor was mixed with lithium carbonate such that the molar ratio of cobalt, nickel and lithium was 0.995:0.005:1. The resulting mixture was then prebaked (first baking) in an atmosphere of air at 600° C. for 10 hours, which was then pulverized.

The pulverized mixture was baked again (second baking) in an atmosphere of air at 900° C. for 10 hours, which was then further pulverized and sieved to give $LiCo_{0.995}Ni_{0.005}O_2$ (hereinafter referred to as "positive electrode active material 8").

A positive electrode plate and a lithium ion secondary battery were produced in the same manner as EXAMPLE 1 except that the positive electrode active material 8 was used instead of the positive electrode active material 1. The thus-obtained positive electrode plate and lithium ion secondary battery are referred to as "positive electrode plate 8" and "battery 8", respectively.

COMPARATIVE EXAMPLE 1

As a lithium-containing composite oxide used as a positive electrode active material, $LiCoO_2$ was prepared in the procedure below.

$LiCoO_2$ serving as a positive electrode active material was prepared in the same manner as EXAMPLE 1 except that the temperature of the second baking after the prebaking (first baking) was changed from 900° C. to 850° C. (hereinafter referred to as "conventional positive electrode active material A").

A positive electrode plate and a lithium ion secondary battery were produced in the same manner as EXAMPLE 1 except that the conventional positive electrode active material A was used instead of the positive electrode active material 1. The thus-obtained positive electrode plate and lithium ion secondary battery are referred to as "conventional positive electrode plate A" and "conventional battery A", respectively.

COMPARATIVE EXAMPLE 2

As a lithium-containing composite oxide used as a positive electrode active material, $LiCoO_2$ was prepared in the procedure below.

$LiCoO_2$ serving as a positive electrode active material was prepared in the same manner as EXAMPLE 1 except that, in the synthesis of the hydroxide precursor, the aqueous solution in the reaction vessel was stirred by a motor at a constant rate of 250 rpm (hereinafter referred to as "conventional positive electrode active material B").

A positive electrode plate and a lithium ion secondary battery were produced in the same manner as EXAMPLE 1 except that the conventional positive electrode active material B was used instead of the positive electrode active material 1. The thus-obtained positive electrode plate and lithium ion secondary battery are referred to as "conventional positive electrode plate B" and "conventional battery B", respectively.

COMPARATIVE EXAMPLE 3

As a lithium-containing composite oxide used as a positive electrode active material, $LiCo_{0.995}Mg_{0.005}O_2$ was prepared in the procedure below.

$LiCo_{0.995}Mg_{0.005}O_2$ serving as a positive electrode active material was prepared in the same manner as EXAMPLE 2 except that, in the synthesis of the hydroxide precursor, the aqueous solution in the reaction vessel was stirred by a motor at a constant rate of 250 rpm (hereinafter referred to as "conventional positive electrode active material C").

A positive electrode plate and a lithium ion secondary battery were produced in the same manner as EXAMPLE 1 except that the conventional positive electrode active material C was used instead of the positive electrode active material 1. The thus-obtained positive electrode plate and lithium ion secondary battery are referred to as "conventional positive electrode plate C" and "conventional battery C", respectively.

COMPARATIVE EXAMPLE 4

As a lithium-containing composite oxide used as a positive electrode active material, $LiCo_{0.995}Al_{0.005}O_2$ was prepared in the procedure below.

$LiCo_{0.995}Al_{0.005}O_2$ serving as a positive electrode active material was prepared in the same manner as EXAMPLE 6 except that, in the synthesis of the hydroxide precursor, the aqueous solution in the reaction vessel was stirred by a motor at a constant rate of 250 rpm (hereinafter referred to as "conventional positive electrode active material D").

A positive electrode plate and a lithium ion secondary battery were produced in the same manner as EXAMPLE 1 except that the conventional positive electrode active material D was used instead of the positive electrode active material 1. The thus-obtained positive electrode plate and lithium ion secondary battery are referred to as "conventional positive electrode plate D" and "conventional battery D", respectively.

COMPARATIVE EXAMPLE 5

As a lithium-containing composite oxide used as a positive electrode active material, $LiCO_{0.995}Mn_{0.005}O_2$ was prepared in the procedure below.

$LiCo_{0.995}Mn_{0.005}O_2$ serving as a positive electrode active material was prepared in the same manner as EXAMPLE 7 except that, in the synthesis of the hydroxide precursor, the aqueous solution in the reaction vessel was stirred by a motor at a constant rate of 250 rpm (hereinafter referred to as "conventional positive electrode active material E").

A positive electrode plate and a lithium ion secondary battery were produced in the same manner as EXAMPLE 1 except that the conventional positive electrode active material E was used instead of the positive electrode active material 1. The thus-obtained positive electrode plate and lithium ion secondary battery are referred to as "conventional positive electrode plate E" and "conventional battery E", respectively.

COMPARATIVE EXAMPLE 6

As a lithium-containing composite oxide used as a positive electrode active material, $LiCo_{0.995}Ni_{0.005}O_2$ was prepared in the procedure below.

$LiCo_{0.995}Ni_{0.005}O_2$ serving as a positive electrode active material was prepared in the same manner as EXAMPLE 8 except that, in the synthesis of the hydroxide precursor, the aqueous solution in the reaction vessel was stirred by a motor at a constant rate of 250 rpm (hereinafter referred to as "conventional positive electrode active material F").

A positive electrode plate and a lithium ion secondary battery were produced in the same manner as EXAMPLE 1 except that the conventional positive electrode active material F was used instead of the positive electrode active material 1. The thus-obtained positive electrode plate and lithium ion secondary battery are referred to as "conventional positive electrode plate F" and "conventional battery F", respectively.

It is to be understood that all the batteries produced in the above examples and comparative examples had a nominal capacity of 500 mAh.

[Evaluation Results]

The powder properties of the lithium-containing composite oxides produced in the above examples and comparative examples and the physical properties of the positive electrodes produced in the same were evaluated in the manners described in the above [Evaluation 1] and [Evaluation 2].

(i) Result 1

Table 1 shows the results for the lithium-containing composite oxide powders produced above in terms of DBP absorption amount, average particle size ($D_{50}$), specific surface area (by BET method) and peel strength between the material mixture and the current collector.

TABLE 1

|  | DBP absorption amount (ml/100 g) | Average particle size (μm) | Specific surface area (m²/g) | Peel strength between material mixture and current collector (N) |
|---|---|---|---|---|
| Ex. 1 | 32 | 5.5 | 0.79 | 7.7 |
| Ex. 2 | 34 | 4.7 | 0.58 | 7.9 |
| Ex. 3 | 22 | 4.4 | 0.51 | 10.7 |
| Ex. 4 | 33 | 5.6 | 0.59 | 8.6 |
| Ex. 5 | 26 | 4.5 | 0.45 | 9.6 |
| Ex. 6 | 36 | 4.9 | 0.75 | 8.1 |
| Ex. 7 | 38 | 5.4 | 0.85 | 7.8 |
| Ex. 8 | 37 | 5.1 | 0.78 | 7.1 |
| Comp. Ex. 1 | 43 | 4.7 | 0.81 | 3.1 |
| Comp. Ex. 2 | 52 | 5.5 | 0.45 | 2.3 |
| Comp. Ex. 3 | 47 | 6.3 | 0.61 | 2.5 |
| Comp. Ex. 4 | 44 | 5.7 | 0.56 | 2.9 |
| Comp. Ex. 5 | 43 | 7.1 | 0.72 | 2.8 |
| Comp. Ex. 6 | 54 | 4.4 | 0.76 | 2.1 |

As can be seen from Table 1, all the lithium-containing composite oxides of COMPARATIVE EXAMPLEs 1 to 6 (i.e. conventional positive electrode active materials A to F) had a DBP absorption amount of over 40 ml/100 g. In terms of peel strength between the material mixture and the current collector, the conventional positive electrode plates A to F of COMPARATIVE EXAMPLEs 1 to 6 had a strength of less than 5 N (newton), which was lower than the level that the present inventors regard as sufficient for practical use.

The lithium-containing composite oxides in EXAMPLEs 1 to 8 (i.e. positive electrode active materials 1 to 8), on the other hand, had a DBP absorption amount of not greater than 40 ml/100 g. In terms of peel strength between the material mixture and the current collector, they all had a strength of over 5 N (newton), which exceeded the level that the present inventors regard as sufficient for practical use.

(ii) Result 2

Table 2 shows the results for the lithium-containing composite oxide powders produced above in terms of NMP absorption amount, average particle size ($D_{50}$), specific surface area (by BET method) and peel strength between the material mixture and the current collector.

TABLE 2

|  | NMP absorption amount (ml/100 g) | Average particle size (μm) | Specific surface area (m²/g) | Peel strength between material mixture and current collector (N) |
|---|---|---|---|---|
| Ex. 1 | 31 | 5.5 | 0.79 | 7.7 |
| Ex. 2 | 37 | 4.7 | 0.58 | 7.9 |
| Ex. 3 | 24 | 4.4 | 0.51 | 10.7 |
| Ex. 4 | 35 | 5.6 | 0.59 | 8.6 |
| Ex. 5 | 29 | 4.5 | 0.45 | 9.6 |
| Ex. 6 | 38 | 4.9 | 0.75 | 8.1 |
| Ex. 7 | 39 | 5.4 | 0.85 | 7.8 |
| Ex. 8 | 36 | 5.1 | 0.78 | 7.1 |
| Comp. Ex. 1 | 52 | 4.7 | 0.81 | 3.1 |
| Comp. Ex. 2 | 56 | 5.5 | 0.45 | 2.3 |
| Comp. Ex. 3 | 57 | 6.3 | 0.61 | 2.5 |
| Comp. Ex. 4 | 54 | 5.7 | 0.56 | 2.9 |
| Comp. Ex. 5 | 53 | 7.1 | 0.72 | 2.8 |
| Comp. Ex. 6 | 59 | 4.4 | 0.76 | 2.1 |

As can be seen from Table 2, all the lithium-containing composite oxides of COMPARATIVE EXAMPLEs 1 to 6 (i.e. conventional positive electrode active materials A to F) had an NMP absorption amount of over 50 ml/100 g. In terms of peel strength between the material mixture and the current collector, the conventional positive electrode plates A to F of COMPARATIVE EXAMPLEs 1 to 6 had a strength of less than 5 N (newton), which was lower than the level that the present inventors regard as sufficient for practical use.

The lithium-containing composite oxides in EXAMPLEs 1 to 8 (positive electrode active materials 1 to 8), on the other hand, had an NMP absorption amount of not grater than 50 ml/100 g. In terms of peel strength between the material mixture and the current collector, they all had a strength of over 5 N (newton), which exceeded the level that the present inventors regard as sufficient for practical use.

(iii) Result 3

Table 3 shows the results for the lithium-containing composite oxide powders produced above in terms of water absorption amount, average particle size ($D_{50}$), specific surface area (by BET method) and peel strength between the material mixture and the current collector.

TABLE 3

|  | Water absorption amount (ml/100 g) | Average particle size (μm) | Specific surface area (m²/g) | Peel strength between material mixture and current collector (N) |
|---|---|---|---|---|
| Ex. 1 | 30 | 5.5 | 0.79 | 7.7 |
| Ex. 2 | 37 | 4.7 | 0.58 | 7.9 |
| Ex. 3 | 25 | 4.4 | 0.51 | 10.7 |
| Ex. 4 | 36 | 5.6 | 0.59 | 8.6 |
| Ex. 5 | 27 | 4.5 | 0.45 | 9.6 |
| Ex. 6 | 38 | 4.9 | 0.75 | 8.1 |
| Ex. 7 | 41 | 5.4 | 0.85 | 7.8 |
| Ex. 8 | 39 | 5.1 | 0.78 | 7.1 |
| Comp. Ex. 1 | 53 | 4.7 | 0.81 | 3.1 |
| Comp. Ex. 2 | 59 | 5.5 | 0.45 | 2.3 |
| Comp. Ex. 3 | 56 | 6.3 | 0.61 | 2.5 |
| Comp. Ex. 4 | 56 | 5.7 | 0.56 | 2.9 |
| Comp. Ex. 5 | 54 | 7.1 | 0.72 | 2.8 |
| Comp. Ex. 6 | 60 | 4.4 | 0.76 | 2.1 |

As can be seen from Table 3, all the lithium-containing composite oxides of COMPARATIVE EXAMPLEs 1 to 6 (i.e. conventional positive electrode active materials A to F) had a water absorption amount of over 50 ml/100 g. In terms of peel strength between the material mixture and the current collector, the conventional positive electrode plates A to F of COMPARATIVE EXAMPLEs 1 to 6 had a strength of less than 5 N (newton), which was lower than the level that the present inventors regard as sufficient for practical use.

The lithium-containing composite oxides in EXAMPLEs 1 to 8 (i.e. positive electrode active materials 1 to 8), on the other hand, had a water absorption amount of not grater than 50 ml/100 g. In terms of peel strength between the material mixture and the current collector, they all had a strength of over 5 N (newton), which exceeded the level that the present inventors regard as sufficient for practical use.

[Analysis of Results]

The conventional view holds that, when the amount of the binder used in the electrode plate is constant, the specific surface area of the active material greatly affects the peel strength between the material mixture and the current collector of the electrode plate. This is based on the idea that because the effective surface area is increased as the specific surface area of the active material is increased, the binder in an amount corresponding thereto is necessary. In other words, when the amount of the binder is constant, as the specific surface area is increased, the binder will be scarce. As a result, the peel strength between the material mixture and the current collector, that is, the binding strength between the particles in the material mixture cannot be maintained, decreasing the strength between the material mixture and the current collector.

The present inventors, however, extensively studied the relationship between the specific surface area of the active material and the peel strength between the material mixture and the current collector, and found that there is not always a correlation between the specific surface area and the peel strength between the material mixture and the current collector.

For example, the comparison between COMPARATIVE EXAMPLEs 1 and 2 indicates that the specific surface area of COMPARATIVE EXAMPLE 2 is much smaller than that of COMPARATIVE EXAMPLE 1 and the peel strength between the material mixture and the current collector of COMPARATIVE EXAMPLE 2 is lower than that of COMPARATIVE EXAMPLE 1.

In order to explain such phenomenon, the present inventors conducted further extensive studies and reached the following conclusion.

Figure 2:
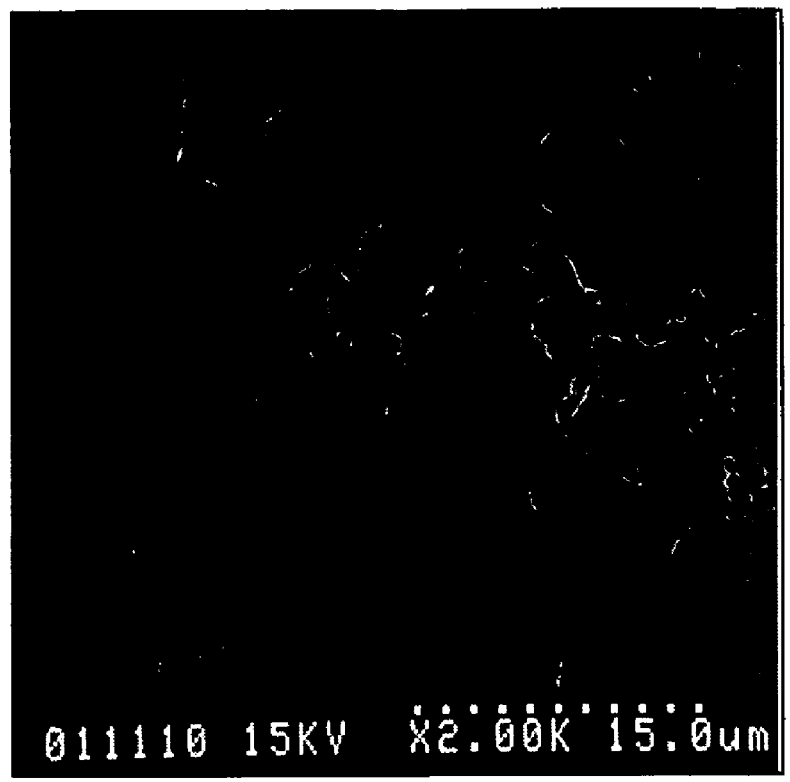
FIG. 2 is an electron microscope image of a positive electrode active material of the present invention under magnification up to 2000.

When the present inventors observed the positive electrode active material under magnification with an electron microscope, it was found that a plurality of the primary particles of the lithium-containing composite oxide aggregated to form secondary particles as shown in FIG. 2. Accordingly, the gas absorption method (BET method) to measure specific surface area, in fact, measures the specific surface area of secondary particles.

In the material mixture paste, however, the binder can enter the space in the secondary particles. It is presumed that the aggregation state of the primary particles in the material mixture paste differs from that of the same when they exist in the form of a powder in a vapor phase.

Meanwhile, when the medium for measuring the powder property of the lithium-containing composite oxide is a liquid, the above defects are expected to be solved. For this reason, the present invention focuses on the DBP absorption amount.

In view of the above, when COMPARATIVE EXAMPLE 1 and EXAMPLE 1 are compared, EXAMPLE 1 has a smaller absorption amount than COMPARATIVE EXAMPLE 1 although the specific surface areas of COMPARATIVE EXAMPLE 1 and EXAMPLE 1 are almost similar. Although COMPARATIVE EXAMPLE 1 requires a larger amount of the binder than EXAMPLE 1, COMPARATIVE EXAMPLE 1 contained the binder in the same amount as EXAMPLE 1, therefore, the binder became scarce, reducing the peel strength between the material mixture and the current collector.

The foregoing clearly demonstrates that it is more practical to measure the powder property using a liquid such as DBP, NMP or water. The reason why superior electrode plates were produced in EXAMPLEs 2 to 6 is likely to be the same reason as above.

[Evaluation 3]

The batteries produced in EXAMPLEs and COMPARATIVE EXAMPLEs were evaluated in the procedure below. The results are shown in Table 4.

(i) Discharge Characteristics at Low Temperature

Each battery having a nominal capacity of 500 mAh was charged at a constant current of 100 mA (1/5 C) in an atmosphere of 20° C. until the battery voltage reached 4.2 V, after which the battery was discharged at a constant current of 500 mA (1 C) until the battery voltage reached 3.0 V. The discharge capacity at 1 C at 20° C. was then obtained.

Subsequently, each battery was charged at a constant current of 100 mA (1/5 C) in an atmosphere of 20° C. until the battery voltage reached 4.2 V, after which the battery was discharged at constant current of 500 mA (1 C) in an atmosphere of 0° C. until the battery voltage reached 3.0 V. The discharge capacity at 1 C at 0° C. was then obtained.

The rate of the discharge capacity at 1 C at 0° C. to the discharge capacity at 1 C at 20° C. was calculated in percentage.

(ii) Recoverability During Storage

Each battery was charged at a constant current of 100 mA (1/5 C) in an atmosphere of 20° C. until the battery voltage reached 4.2 V, after which the battery was discharged at a constant current of 100 mA (1/5 C) until the battery voltage reached 2.75 V. The discharge capacity at 1/5 C was then obtained.

Subsequently, each battery was charged at a constant current of 100 mA (1/5 C) in an atmosphere of 20° C. until the battery voltage reached 4.2 V, after which the battery was stored in a chamber held at a constant temperature of 65° C. for 72 hours.

After storage, the battery was discharged at a constant current of 100 mA (1/5 C) in an atmosphere of 20° C. until the battery voltage reached 2.75 V. The discharge capacity at 1/5 C was then obtained.

The rate of the discharge capacity at 1/5 C after storage at 65° C. to the discharge capacity at 1/5 C before storage was calculated in percentage.

(iii) Cycle Life Test

Each battery was charged at a constant current of 100 mA (1/5 C) in an atmosphere of 20° C. until the battery voltage reached 4.2 V, after which the battery was discharged at a constant current of 500 mA (1 C) until the battery voltage reached 3.0 V. This cycle was repeatedly performed.

The rate of the discharge capacity at the 500th cycle to the initial discharge capacity was calculated in percentage.

TABLE 4

| | Discharge characteristics at low temperature (%) | Recoverability after Storage (%) | Cycle life test (%) |
|---|---|---|---|
| Ex. 1 | 98 | 92 | 87 |
| Ex. 2 | 98 | 88 | 89 |

TABLE 4-continued

| | Discharge characteristics at low temperature (%) | Recoverability after Storage (%) | Cycle life test (%) |
|---|---|---|---|
| Ex. 3 | 99 | 94 | 91 |
| Ex. 4 | 97 | 91 | 94 |
| Ex. 5 | 98 | 93 | 92 |
| Ex. 6 | 99 | 94 | 92 |
| Ex. 7 | 99 | 92 | 93 |
| Ex. 8 | 97 | 93 | 93 |
| Comp. Ex. 1 | 78 | 67 | 63 |
| Comp. Ex. 2 | 68 | 59 | 57 |
| Comp. Ex. 3 | 85 | 62 | 58 |
| Comp. Ex. 4 | 83 | 46 | 52 |
| Comp. Ex. 5 | 88 | 71 | 67 |
| Comp. Ex. 6 | 79 | 61 | 49 |

As can be seen from Table 4, all the batteries 1 to 8 of EXAMPLES 1 to 8 were excellent in all properties. Presumably, this is because, in EXAMPLEs 1 to 8, the positive electrode active material and the binder were thoroughly mixed during the production of the positive electrode plate, and therefore the optimal material mixture paste was obtained. This is considered relevant to the fact that the positive electrode plates 1 to 8 had a sufficient strength. At the same time, it is surmised that the active material was also optimally covered with the binder, allowing the electrochemical reaction of the active material to proceed optimally.

The foregoing results have proved that it is effective that the lithium-containing composite oxide powder has a DBP absorption amount of 20 to 40 ml per 100 g of the lithium-containing composite oxide powder, that the lithium-containing composite oxide powder has a NMP absorption amount of 20 to 50 ml per 100 g of the same and that the lithium-containing composite oxide powder has a water absorption amount of 20 to 50 ml per 100 g of the same.

It should be noted that although the above examples used the A test method according to JIS K6217 (1997) to determine the absorption amounts, similar results can be obtained when the B test method based on the same JIS standard is used.

Moreover, although the above examples used a non-aqueous electrolyte prepared by dissolving a lithium salt in a non-aqueous solvent, even in secondary batteries containing a polymer electrolyte such as hydrogen ion conductive solid electrolyte, similar results can be obtained.

A non-aqueous electrolyte secondary battery of the present invention is highly reliable, and therefore useful when it is used as a portable power source which is expected to provide a high level of safety.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode active material for a non-aqueous electrolyte secondary battery comprising a lithium-containing composite oxide powder, wherein an absorption amount of a liquid reagent absorbed by said powder is 20 to 40 ml per 100 g of said powder when said liquid reagent is dibutyl phthalate (DBP), and an absorption amount of a liquid reagent absorbed by said powder is 20 to 50 ml per 100 g of said powder when said liquid reagent is N-methyl-2-pyrrolidone (NMP) or water, said absorption amount is a value measured using a device according to A test method or B test method regarding DBP absorption based on JIS K6217 (1997), said measured value is an amount of said liquid reagent added until the viscosity of a mixture of said powder and said liquid reagent reaches a level corresponding to 70% of maximum torque which is recorded when said powder is introduced into said device, and said liquid reagent is added dropwise thereto, during which a change in the viscosity of a mixture of said powder and said liquid reagent is measured by a torque detecting device, and wherein, said lithium-containing composite oxide powder is represented by a formula $Li_aMO_2$, where M is selected from the group consisting of Co, CoMg, CoAl, CoMn and CoNi.

2. A non-aqueous electrolyte secondary battery comprising:

an electrode group comprising a negative electrode plate, a positive electrode plate containing the positive electrode active material according to claim 1, and a separator interposed between said negative electrode plate and said positive electrode plate;

a battery case for housing said electrode group; and a non-aqueous electrolyte to be injected into said battery case.

* * * * *